US008857709B2

(12) United States Patent
Hancock et al.

(10) Patent No.: US 8,857,709 B2
(45) Date of Patent: Oct. 14, 2014

(54) AUTOMATIC PACKAGE DELIVERY AND RETRIEVAL SYSTEM

(75) Inventors: Stephen H. Hancock, Wake Forest, NC (US); Norman B. Desrosiers, Oxford, NC (US); Eric Fiest, Raleigh, NC (US); John Rupert, Raleigh, NC (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 13/563,317

(22) Filed: Jul. 31, 2012

(65) Prior Publication Data

US 2014/0034727 A1  Feb. 6, 2014

(51) Int. Cl.
*G06F 17/00* (2006.01)

(52) U.S. Cl.
USPC ........... 235/380; 235/384; 235/379; 235/375; 705/14.33; 705/404; 705/410

(58) Field of Classification Search
USPC ........ 235/380, 384, 379; 705/14.33, 404, 410
See application file for complete search history.

(56) References Cited

U.S. PATENT DOCUMENTS

| | | | |
|---|---|---|---|
| 6,201,203 B1* | 3/2001 | Tilles | 209/584 |
| 2004/0039712 A1* | 2/2004 | Tartal et al. | 705/404 |
| 2004/0153379 A1* | 8/2004 | Joyce et al. | 705/28 |
| 2008/0071418 A1* | 3/2008 | Antony et al. | 700/214 |
| 2010/0153291 A1* | 6/2010 | Jimenez et al. | 705/330 |
| 2011/0196732 A1* | 8/2011 | Schueller et al. | 705/14.33 |
| 2012/0185363 A1* | 7/2012 | Gilbert | 705/27.1 |

\* cited by examiner

*Primary Examiner* — Allyson Trail
(74) *Attorney, Agent, or Firm* — Volpe and Koenig, P.C.

(57) ABSTRACT

Described herein are an automatic package delivery and retrieval apparatus, system and method. The automatic package delivery and retrieval includes a Package Delivery Kiosk (PDK), associated front end and back end package delivery management systems, portals for the consumer and the retailer, portals for the common carrier, sender, and recipient, a package inventory management system, integrated retailer access, a real and automated retailer bidding system and a kiosk for distribution. In one embodiment, a system for automated package retrieval and delivery includes a kiosk, package retrieval apparatus, and various computing systems for running the systems. A method for providing packages to customers includes providing a notification with a code to a user that a package is available for retrieval. The method includes storing a package in the kiosk. The method further includes receiving the code from a user at the kiosk and retrieving the package with the automatic retrieval mechanism.

18 Claims, 3 Drawing Sheets

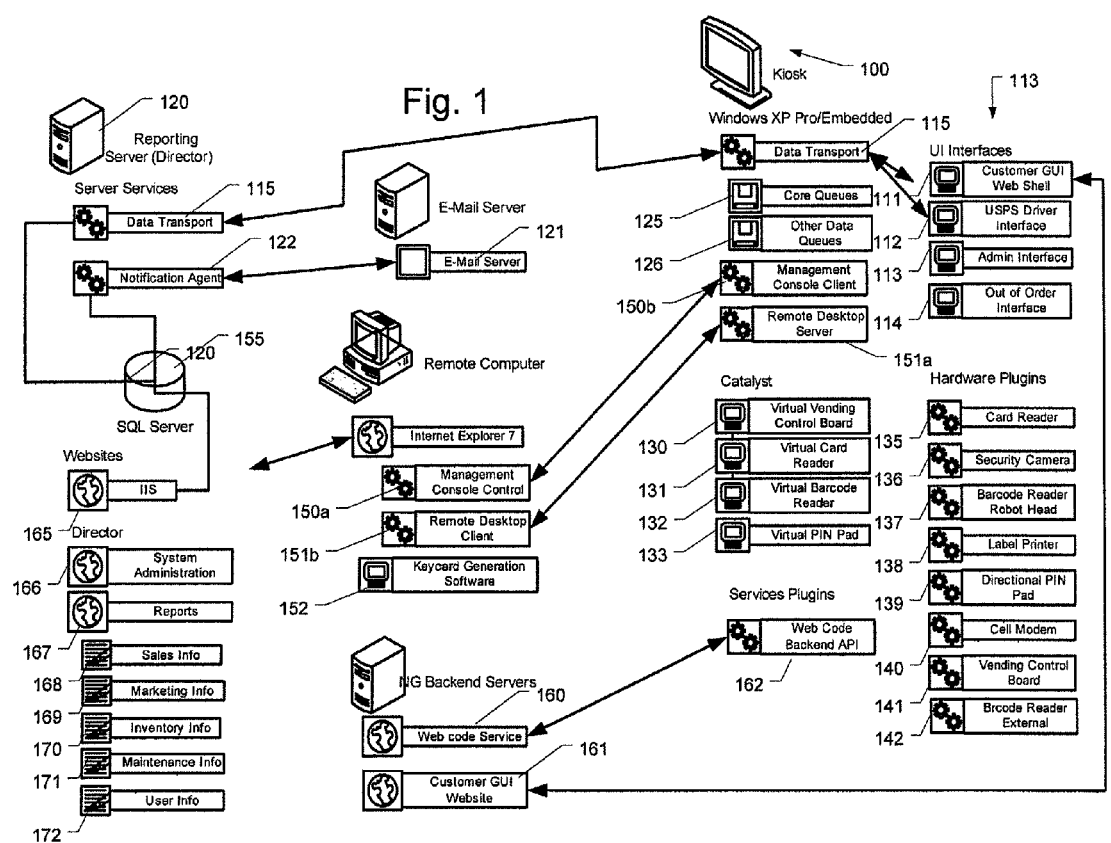

AUTOMATIC PACKAGE DELIVERY AND RETRIEVAL SYSTEM

CROSS REFERENCE TO RELATED APPLICATIONS

This application is related to co-pending application entitled "ROBOTIC PACKAGE LIFTING ASSEMBLY AND METHOD" having Ser. No. 13/563,158, filed concurrently herewith; co-pending application entitled "SHELVING AND KIOSK SYSTEM" having Ser. No. 13/563,255, filed concurrently herewith; co-pending application entitled "ON DEMAND KIOSK COMMERCE SYSTEM AND METHOD" having Ser. No. 13/563,361, filed concurrently herewith; and co-pending application entitled "PACKAGE DELIVERY KIOSK INCLUDING INTEGRATED ROBOTIC PACKAGE LIFTING ASSEMBLY WITH SHELVING SYSTEM" having Ser. No. 13/563,410, filed concurrently herewith, the contents of which are hereby incorporated by reference herein.

BACKGROUND

The cost associated with operating a physical store front or delivering packages via mail or other package delivery common carriers is a significant expense of doing business. The last mile of delivery of packages is many times a large percentage of the expense of delivery, especially as compared to the total distance a package travels. In some cases, individuals living in apartment type dwellings can only receive packages if they are there to physically sign for them. Considering the hours of delivery and the hours most people work, home delivery is therefore impossible. In this case the resident must go to a post office or other depot during business hours. This provides for similar difficulty.

Increasingly consumers desire immediate satisfaction of orders and purchases. In order to do so they request express shipping, (at some cost), or go to a physical store front. When going to a physical store front, the consumer may not feel as though they are getting the best prices so they may be reluctant to purchase. Consumers may return home and search on Internet shopping sites in order to obtain the best price. Also, the store may not be open or may be far away. In such case they delay acquisition of the item of interest.

Therefore, when customers receive or purchase a package, but delivery to the home or pickup at a human operated site are impracticable, an automatic pickup system and location is needed.

BRIEF SUMMARY

Described herein are an automatic package delivery and retrieval apparatus, system and method. The automatic package delivery and retrieval may include a Package Delivery Kiosk (PDK), associated front end and back end package delivery management systems, portals for the consumer and the retailer, portals for the common carrier, sender, and recipient, a package inventory management system, integrated retailer access, a real and automated retailer bidding system and a kiosk for distribution. In one embodiment, a system for automated package retrieval and delivery includes a kiosk, package retrieval apparatus, and various computing systems for running the systems. A method for providing packages to customers includes providing a notification to a user that a package is available for retrieval, the notification including a code. The method further includes storing a package in a kiosk, the kiosk including an automatic retrieval mechanism. The method further includes receiving the code from a user at the kiosk and retrieving the package for the user with the automatic retrieval mechanism.

BRIEF DESCRIPTION OF THE FIGURES

A more detailed understanding may be had from the following description, given by way of example in conjunction with the accompanying drawings wherein:

FIG. 1 shows one embodiment of a system for automated package retrieval and delivery.

DETAILED DESCRIPTION

Figure 2A:
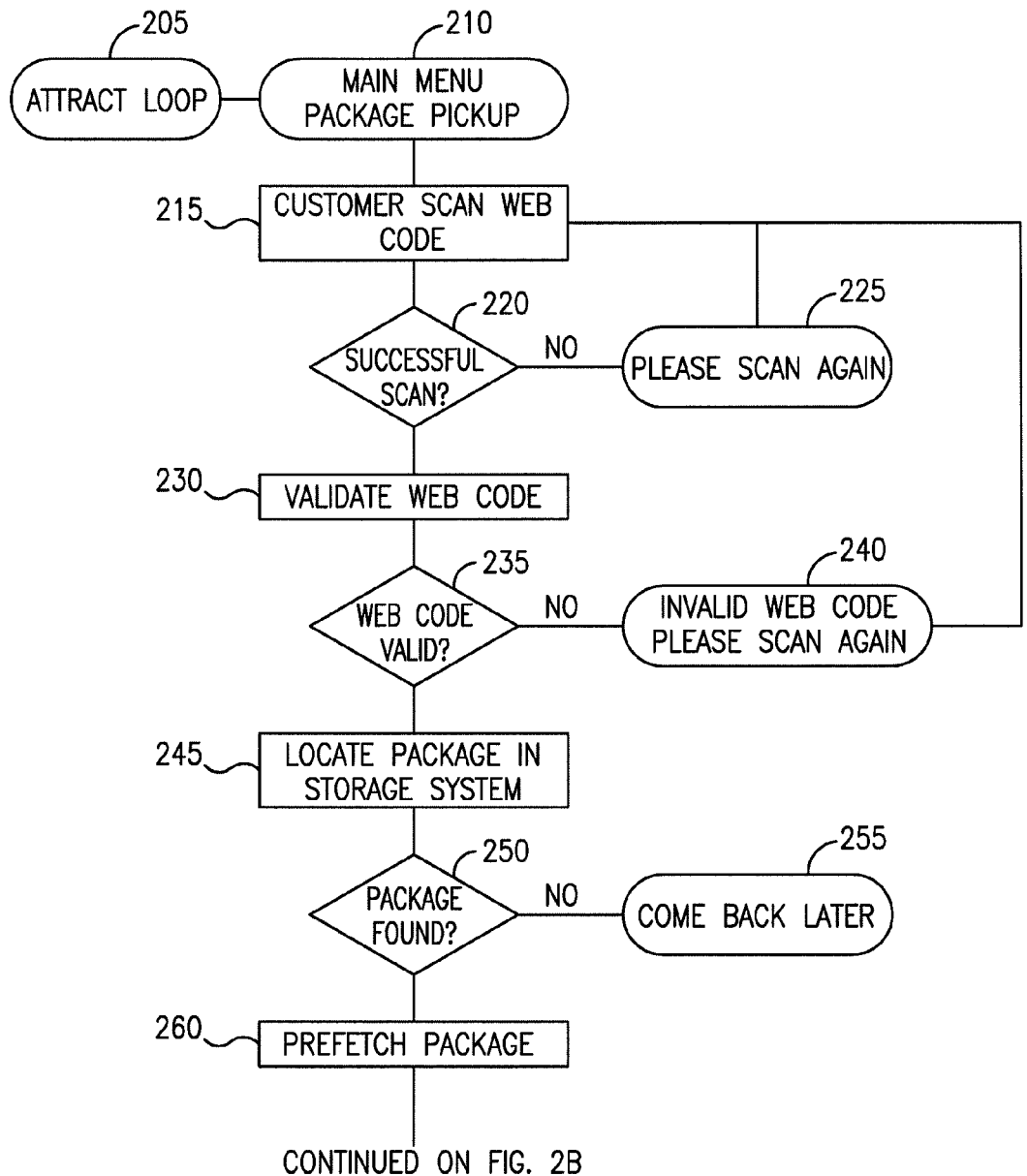
FIG. 2 refers to FIGS. 2A and 2B and shows an example of a user interface for use with the system for automated purchase retrieval and delivery.

Certain terminology is used herein for convenience only and is not to be taken as a limitation on the embodiments of a system for automated package retrieval and delivery. In the drawings, the same reference letters are employed for designating the same elements throughout the several figures.

The words "right", "left", "front", and "back" designate directions in the drawings to which reference is made. The words "inwardly" and "outwardly" refer to directions toward and away from, respectively, the geometric center of the case with flexible body portion and designated parts thereof. The terminology includes the words above specifically mentioned, derivatives thereof, and words of similar import. The drawings are proportional.

Like reference numerals designate like or corresponding parts throughout the various views and with particular reference to each of the figures as delineated below.

For a common carrier package delivery system, when a user is scheduled to receive a package, but delivery is impracticable for various reasons, a user receives a notification of the pending delivery. Reasons that a delivery may be impracticable may be that the common carrier has established that it cannot safely deliver a package without a person to physically receive it, the common carrier has made repeated attempts at delivery, the person lives in an apartment complex, the package requires signature, or a variety of other reasons. The common carrier may then generate a notice to the user that a package is available for pick up at a kiosk. This is more convenient for the user since the kiosk may have unlimited operating hours, nearby kiosks may be available and less expensive for the common carrier since employees are not constantly required to service customers. The notification of pending delivery may come in the form of a paper delivered notice via U.S. mail or other common carrier, an electronic notification such as email, Short Message Service (SMS), or telephone call. This notice may include authentication information for the user to pickup the package or information on how to obtain authentication information. The user may be required to visit a website or physical storefront and provide information, (i.e., personal information and identification), to receive the authentication information.

The user may then go to the area kiosk that stores the user's package. Kiosks may be located to provide for convenient package retrieval. Optionally, once a user registers for package delivery, the user may specify which of the area kiosks the user wishes to receive packages at.

At the kiosk, a touch screen interface greets the user, and the user provides the authentication information including, for example, a personal pin code, a web code or other code identifying the package. The kiosk confirms that the package is available using the system software installed on the kiosk.

The kiosk cross-references the codes provided to ensure authentication. The kiosk additionally may have cameras to record images of the user that accesses the kiosk. Additionally, the kiosk may have automatic finger print storage and may image fingerprints as the user touches the screen of the interface. As alternatives, other types of interfaces may be used, including those utilizing keyboards, rollerballs, or other interfaces.

The customer then provides a signature to receive the package. This may be optional. If the customer ceases to provide input or signature, then the system may be configured to time out and return to the initial screen. Optionally, the security camera may be configured to detect when a user leaves the interface and automatically timeouts upon such an occurrence. Optionally, the security camera may simply take one or a number of pictures during the interaction.

After the entire required authentication has been achieved, the kiosk system may retrieve the package and deliver it to the outlet system for the user to obtain through a slot or other delivery area.

The system further includes an operation procedure for an operator (common carrier). The system may be configured to track which packages in the kiosk have been resident for an extended period of time. The kiosk may automatically sort these packages into a predefined area in the kiosk and their "dead" status reported.

The machine may then be accessed by the operator. During preferably a non-busy time, the operator may enter a special code into the touch screen interface providing for access to the packages and system. The kiosk may then automatically unlock itself or the operator may unlock another manual lock. A maintenance screen is displayed and the system becomes inactive. The operator may then retrieve dead packages, either from a dedicated area or according to information provided by the interface. New packages may be then inserted by size and bar code identifying information. The operator then confirms the completion of package exchange using the touch screen and in some cases locking the kiosk. The kiosk confirms that a successful package exchange and lock has been made and then begins to process each package.

The kiosk system then reads the bar code from each package and stores the identifying information and location of the package. In some cases the kiosk may then proceed to relocate packages. The kiosk can send tracking notification to a central server indicating that a package is available for pickup. The central server may then contact related systems and print notifications for the customer to be delivered, or sent via email or other electronic communications to the customer.

The kiosk system provides 24 hour, seven day a week package pickup in a secure environment. It eliminates the delivery cost to the end customer and multiple delivery attempts when the package can not be left at the destination site. The system confirms delivery and captures signature, (picture optional). It provides complete tracking of the package to point of delivery possession. The kiosk and retrieval system can offer 2× or better space advantage over less secure locker boxes FIG. 1 shows one embodiment of a system for automated package retrieval and delivery. As shown, a kiosk and related systems may be implemented in hardware and software. The kiosk 100 may implement various modules. The kiosk 100 may implement multiple user interfaces, for example, a customer graphics user interface (GUI) 111, a United States Postal Service (USPS) driver interface 112, an administrative interface 113 and an out of order interface. The customer GUI 111 is a graphical user interface and provides for the user to interact with the kiosk 100. The user may be able to determine information about the package including, for example, the sender, the size, the time it has been waiting for pickup, and any other potential information concerning the package. The user may also be able to retrieve information concerning the kiosk 100, including location, access hours, accessibility of the handicap, and any other information available about the kiosk.

The USPS Driver Interface 112 may provide the user access to the package for retrieval. This interface 112 provides for the entering of the identification information for the package and the user request for packages or other information. Although this is labeled USPS, it may be for any common carrier.

Administration driver 113 provides for access to the kiosk 100 for cleaning and testing functions, loading and unloading, and reconfiguration features. The kiosk 100 includes a robotic package retrieving apparatus and a number of package slots. As described herein, an operator may come to change out dead packages and add new packages. Further, the package slots may be periodically reconfigured and therefore the operator may provide information to the system concerning the new location of slots. The operator may then initiate an alignment procedure where the robotic package retrieving system, also know as a Robotic Package Lifting Assembly (RPLA), attempts to align with the newly entered slots. The operator may then observe the RPLA and register if any alignments are off.

Out of order interface 114 provides for an out of order signal to users and operators. This interface 114 does not provide for access for package retrieval, however, it may provide for diagnosis information and access for the operator.

Customer GUI 111 and USPS Driver 112 communicate with data transport layer 115. Customer GUI 111 provides for access via the Internet. Data transport layer 115 may communicate with reporting server 120. Reporting server 120 may report the pickup of a package by either directing digital messaging or mail messaging. Digital messaging may be accomplished through notification agent 122 or email server 121. Notification agent 122 or email server 121 may send emails, SMS messages or any other type of electronic message to the package sender, recipient and the operator/common carrier as required by protocol and preferences.

Kiosk 100 may include core queues 125 and other data queues 126. These queues may track the location, resident time, pickup information, and other information concerning the resident packages and overall performance of the system.

The user interfaces of the kiosk may be controlled by a number of touch screen modules. These modules may include: virtual vending control board 130 which provides control of the package selection process; virtual card reader 131 which provides for scanning of credit cards and other cards; virtual bar code reader 132 which provides for scanning of bar codes associated with package pickups; and virtual pin pad 133 which provides for a virtual pin pad for entering a pin. These provide for virtualizations that allow a user to navigate the kiosk.

A number of hardware plug-ins are also included to assist in the control of the system, including, card reader plug-in 135 for reading cards, security camera plug-in 136 for operating and interfacing with the security camera, barcode reader 137 for use with the RPLA, label printer 138 for print labels for dropped-off packages, directional pin pad plug-in 139 for controlling the operation and display of the pin pad, call modem 140, vending control board 141 for controlling the RPLA and barcode reader external 142 for providing external barcode reading functions.

The kiosk system 100 may also include a management console 150 for the client and a remote desktop server 151. The management console 150a provides for control through management console client 150b. A client may use a remote desktop client 151b connected to a remote desktop server 151a to access the kiosk 100. These may be accessible through a Web browser, for example, an Internet Explorer interface and may include software for generating retrieval keys to the kiosk using module 152.

Through data transport 115 various systems may report to SQL server 155 which serves as the primary repository of information for the kiosk and related systems. The backend servers 160 and 161 may provide for Web access to users and operators through the Web code backend application programming interface 162. Further information about the performance and history of the kiosk may be stored and reported to SQL server 155 and accessible through IIS 165 and system administration 166. Reports concerning the performance may be produced through the reports module 167, including reports on sales information 168, marketing information 169, inventory information 170, maintenance information 171, and user information 172.

Figure 2B:
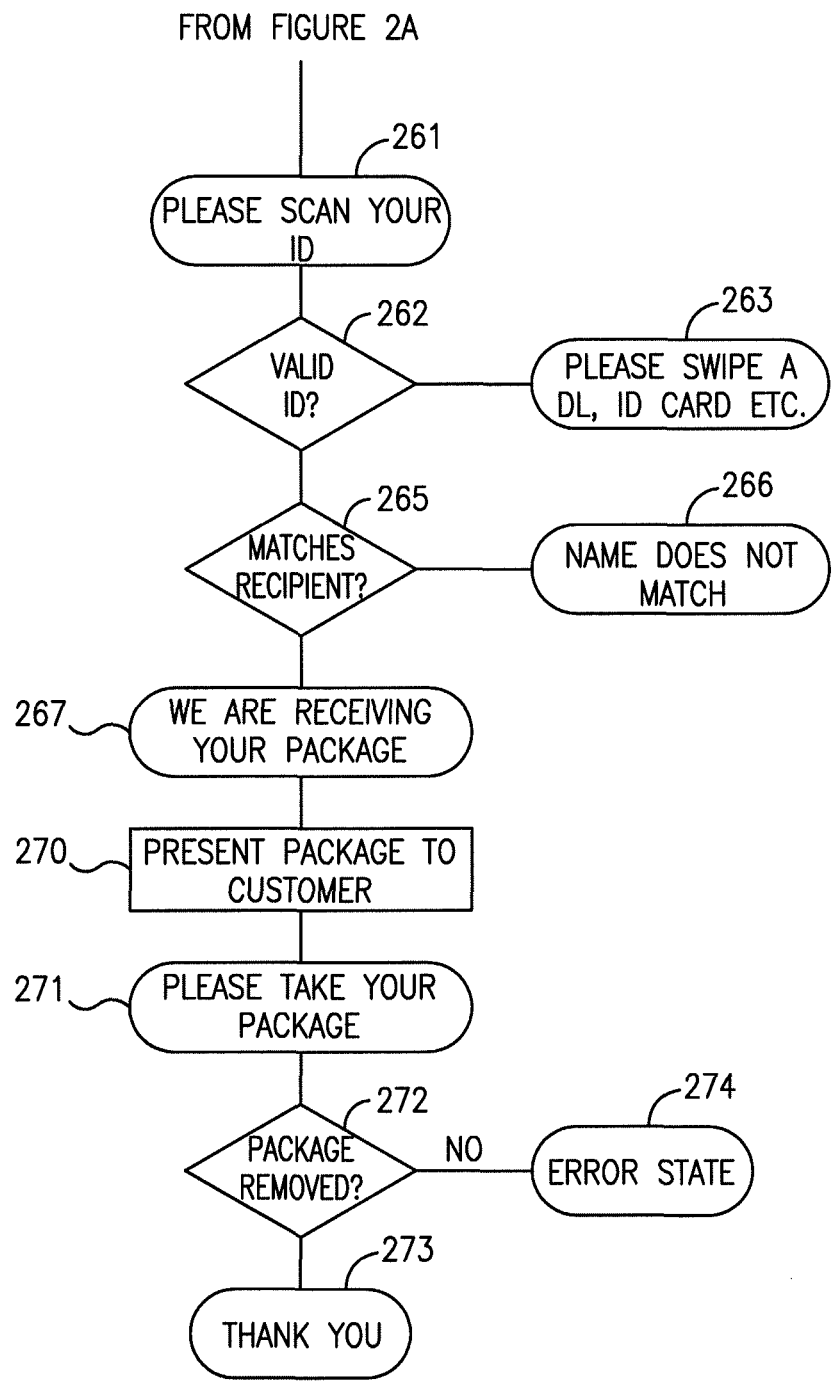

FIG. 2 shows an example of a user interface flowchart for the kiosk. Starting at attract loop 205, the system displays a loop that will attract users to the screen and display a message such as "touch to begin." When the user touches the screen, the flow proceeds to the main menu screen (210). The user may scan the web code on their notice (215). Alternatively, the system may allow for the user to enter a code. If the scan is determined unsuccessful (220, no), the user will be prompted to scan again (225). If the scan is successful (220, yes), the web code will be validated (230). If the code is determined to be invalid (235, no), the user is notified of an invalid code (240). The user may then re-enter or scan the web code again (215). If the code is valid (235, yes), the location of the package in the system is determined (245). If the package is not found (250, no), the user is notified to come back later (255) or otherwise informed to contact support.

If the package is found (250, yes), the package is prefetched in that the RPLA may align with the package location (260). A request for the user to scan their id is requested (261). This may be a license or other preapproved identification. The validity of the id is determined (262). If the id is not valid (262, no), the system will request a rescan (263). If the id is valid (262, yes), it is determined whether the recipient name matches the id provided (265). If the name does not match (265, no), the user will be prompted that the name does not match (266). Some systems may permissively allow non-matching users access. In the alternative, no access may be provided. In the alternative, a pin may be required as well. If the name does match (265, yes), the user is informed of package retrieval (267). The user is requested to take the package (270). It is determined whether the user took the package (271). If the user did take the package (272, yes), the system terminates in a thank you (273). If the user fails to take the package (272, no), the system provides an error message (274).

In some embodiments, the kiosk may be additionally configured for sending packages. In this case the user will indicate using the touch screen interface information concerning the package. The kiosk may print a bar code for attachment to the package. The user may then insert the package and the RPLA will retrieve the package and place the package in a slot reserved for packages to be sent. The user may then provide payment information and complete the transaction. During regular drop-off and pickup of packages, the operator will retrieve the package and carry out the delivery. Alternatively, the user may print the bar code information from a home computer and affix it to the package prior to visiting a kiosk site. The common carrier may offer a discount to the user for such a service, since the common carrier will potentially save on home pickup costs and physical storefront costs. In some embodiments, the kiosk may additionally include a slot that includes a scale for package weighing functions for determination of shipping costs.

The user may follow tracking information concerning the package pickup from the kiosk and eventual delivery to the destination. Upon deposit, the kiosk may generate an expected delivery time and date based on kiosk pickup times and standard delivery models. This may provide the user additional flexibility over traditional models, since the user may access the kiosk at any time of the day.

In general, a method for providing packages to customers includes providing a notification to a user that a package is available for retrieval. The notification may include a code. The method further includes storing a package in a kiosk, the kiosk including an automatic retrieval mechanism. The method further includes receiving the code from a user at the kiosk and retrieving the package for the user with the automatic retrieval mechanism.

Optionally, the method further includes authenticating the user prior to retrieving the package. In one alternative, the authenticating includes scanning a personal identification card of the user. Optionally, authenticating includes receiving a pin from the user. In one configuration, the notification is a notice received in the mail. In another configuration, the notification includes the code and the code is a scannable code and the receiving the code includes scanning the scannable code on the notification.

Optionally, the user may sign up for kiosk delivery of packages from a common carrier as an alternative to home delivery. In one configuration, the kiosk is located in a location where it is accessible to users 24 hours a day.

Optionally, the automatic retrieval mechanism is a RPLA located inside the kiosk and the kiosk includes a plurality of shelves, the plurality of shelves having a plurality of slots. Alternatively, the location of a package in a slot of the plurality of slots is stored in a computing system. The code is associated with the package. Optionally, when the package is stored in the kiosk for greater than a set period of time, it is considered dead and the RPLA retrieves the package and places the package in a slot of the plurality of slots reserved for dead packages for retrieval and removal.

In one embodiment, a system for providing automated retrieval of packages to a user includes a kiosk where packages may be delivered to the kiosk by a carrier. The kiosk includes an automatic retrieval mechanism, a touch screen interface, and a computing system for controlling the touch screen interface and automatic retrieval mechanism. The system further includes a notification provided to the user. The notification provides a code for the user to enter at the touch screen interface, the code activating the automatic retrieval mechanism and retrieving a package for the user.

Optionally, the automatic retrieval mechanism is a RPLA located inside the kiosk. The kiosk includes a plurality of shelves having a plurality of slots and the location of a package in a slot of the plurality of slots is stored in a computing system. The code is associated with the package. In one configuration, when the package is stored in the kiosk for greater than a set period of time, it is considered dead and the RPLA retrieves the package and places the package in a slot of the plurality of slots reserved for dead packages for retrieval and removal.

Optionally, the computing system includes a plurality of modules configured to report package pickups and availability to a reporting server. Alternatively, the plurality of modules is configured to control a security camera situated at the kiosk. In one alternative, the plurality of modules is configured to provide access to information concerning the kiosk to a user utilizing the Internet. In another alternative, the plurality of modules is configured to provide a menu driven graphical user interface to the user for retrieving packages. The interface configured to provide for scanning procedures of the code and scanning procedures of an user identification. Optionally, the plurality of modules is configured to receive information concerning the package location and package identification from the RPLA. The RPLA may provide the package location by encoding the position of packages in the plurality of slots and scanning a bar code on each of the packages.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein, but is intended to cover modifications within the spirit and scope thereof as defined by the appended claims and any and all equivalents thereof. Note that, although particular embodiments are shown, features of each may be interchanged between embodiments.

What is claimed is:

1. A method for providing packages to customers, comprising:
   providing a notification to a user that a package is available for retrieval, the notification including a code;
   storing a package at a user specified kiosk in one of a plurality of reconfigurable package slots, the user specified kiosk including an automatic retrieval mechanism;
   receiving the code from a user at the user specified kiosk;
   retrieving the package for the user with the automatic retrieval mechanism;
   reconfiguring the plurality of package slots; and
   aligning the automatic retrieval mechanism to the reconfigured plurality of package slots,
   wherein when the package is stored in the user specified kiosk for greater than a set period of time is considered dead and the automatic retrieval mechanism retrieves the package and places the package in a predetermined location reserved for dead packages for retrieval and removal.

2. The method of claim 1, further comprising: authenticating the user prior to retrieving the package.

3. The method of claim 2, wherein the authenticating includes scanning a personal identification card of the user.

4. The method of claim 2, wherein the authenticating includes receiving a pin from the user.

5. The method of claim 1, wherein the notification is a notice received in the mail.

6. The method of claim 5, wherein the notification includes the code and the code is a scannable code and the receiving the code includes scanning the scannable code on the notification.

7. The method of claim 1, wherein the user may sign up for kiosk delivery of packages from a common carrier as an alternative to home delivery.

8. The method of claim 7, wherein the user specified kiosk is located in a location where it is accessible to users 24 hours a day.

9. The method of claim 1, wherein the automatic retrieval mechanism is a Robotic Package Lifting Apparatus located inside the user specified kiosk and the user specified kiosk includes a plurality of shelves, the plurality of shelves having a plurality of slots.

10. The method of claim 9, wherein the location of a package in a slot of the plurality of slots is stored in a computing system and when the code is associated with the package.

11. A system for providing automated retrieval of packages to a user, the packages delivered by a common carrier, the system comprising:
   a user-specified kiosk, the user-specified kiosk including a plurality of reconfigurable package slots, an automatic retrieval mechanism, a touch screen interface, and a computing system for controlling the touch screen interface and automatic retrieval mechanism, wherein when a package is stored in the user-specified kiosk for greater than a set period of time is considered dead and the automatic retrieval mechanism retrieves the package and places the package in a predetermined location reserved for dead packages for retrieval and removal; and
   a notification, provided to a user, the notification providing for a code for the user to enter at the touch screen interface, the code activating the automatic retrieval mechanism and retrieving a package for the user.

12. The system of claim 11, wherein the automatic retrieval mechanism is a Robotic Package Lifting Apparatus (RPLA) located inside the user specified kiosk and the user specified kiosk includes a plurality of shelves, the plurality of shelves having the plurality of package slots and the location of a package in a package slot of the plurality of package slots is stored in a computing system and the code is associated with the package.

13. The system of claim 11, wherein the notification is a piece of mail and the code is a scannable electronic code.

14. The system of claim 13, wherein the computing system includes a plurality of modules, the plurality of modules configured to report package pickups and availability to a reporting server.

15. The system of claim 14, wherein the plurality of modules is configured to control of a security camera, situated at the user specified kiosk.

16. The system of claim 14, wherein the plurality of modules is configured to provide access to information concerning the user specified kiosk to a user utilizing the internet.

17. The system of claim 14, wherein the plurality of modules is configured to provide a menu driven graphical user interface to the user for retrieving packages, the interface configured to provide for scanning procedures of the code and scanning procedures of a user identification.

18. The system of claim 14, wherein the plurality of modules is configured to receive information concerning package location and package identification from the RPLA, the RPLA providing the package location by encoding the position of packages in the plurality of slots and scanning a bar code on each of the packages.

* * * * *